US012595685B2

(12) United States Patent
Hart et al.

(10) Patent No.: US 12,595,685 B2

(45) Date of Patent: Apr. 7, 2026

(54) SMART LOCKING SYSTEM

(71) Applicants: Joshua Hart, Granite Bay, CA (US); Sam Ristich, Los Angeles, CA (US)

(72) Inventors: Joshua Hart, Granite Bay, CA (US); Sam Ristich, Los Angeles, CA (US)

(*) Notice: Subject to any disclaimer, the term of this patent is extended or adjusted under 35 U.S.C. 154(b) by 0 days.

(21) Appl. No.: 18/768,329

(22) Filed: Jul. 10, 2024

(65) Prior Publication Data

US 2026/0015891 A1 Jan. 15, 2026

(51) Int. Cl.

| | |
|---|---|
| ***E05B 65/00*** | (2006.01) |
| ***E05B 47/00*** | (2006.01) |
| *G08C 17/02* | (2006.01) |

(52) U.S. Cl.

CPC ........ *E05B 65/006* (2013.01); *E05B 47/0001* (2013.01); *G08C 17/02* (2013.01)

(58) Field of Classification Search

CPC .. E05B 41/00; E05B 47/0001; E05B 47/0094; E05B 65/006; E05B 65/005; E05B 65/0864; E05B 65/5238; E05B 65/5215; E05B 65/523; E05B 65/48; E05B 65/5284; E05B 55/00; E05B 63/0017; E05B 65/0089; E05C 19/08; G09F 3/0382; G09F 3/0388

USPC .......................................................... 292/281

See application file for complete search history.

(56) References Cited

U.S. PATENT DOCUMENTS

| | | | | |
|---|---|---|---|---|
| 1,598,286 A * | 8/1926 | La Marsh | E05B 65/48 70/10 | |
| 3,834,746 A * | 9/1974 | Hinden | E05C 19/182 292/DIG. 60 | |
| 6,463,769 B1 * | 10/2002 | Garner | E05B 67/38 292/205 | |
| 7,097,214 B2 * | 8/2006 | Tsai | E05B 65/0864 292/156 | |
| 2003/0136159 A1 * | 7/2003 | Vito | E05C 19/08 70/56 | |
| 2004/0187533 A1 * | 9/2004 | Huang | E05B 41/00 70/432 | |

(Continued)

FOREIGN PATENT DOCUMENTS

| | | | |
|---|---|---|---|
| AT | 516392 A4 * | 5/2016 | E05B 15/004 |
| CN | 113332520 A * | 9/2021 | |

(Continued)

OTHER PUBLICATIONS

Espacenet, machine translation of RU 2765622 C1, generated Oct. 11, 2024. (Year: 2024).*

(Continued)

*Primary Examiner* — Kristina R Fulton

*Assistant Examiner* — Emily G. Brown

(57) ABSTRACT

A locking system. The locking system includes a first portion including a locking slot and a second portion including a locking tab. The first portion is configured with a panel of a utility box and the second portion is configured with a side of the utility box. When the utility box panel is closed, the locking tab is received into the locking slot and a locking pin is configured to lock the locking tab therein. The system includes guards that limit access to the locking tab and to the locking pin thereby minimizing potential tampering of the system. The system also includes a motion sensing system and a communications module.

18 Claims, 13 Drawing Sheets

(56) References Cited

U.S. PATENT DOCUMENTS

| | | | | |
|---|---|---|---|---|
| 2017/0204637 | A1* | 7/2017 | Matyko | E05B 67/02 |
| 2019/0053621 | A1* | 2/2019 | Boeckenstedt | A47B 83/045 |

FOREIGN PATENT DOCUMENTS

| | | | | | |
|---|---|---|---|---|---|
| CN | 116988695 | A | * | 11/2023 | E05B 17/2023 |
| JP | 2000080841 | A | * | 3/2000 | |
| RU | 2765622 | C1 | * | 2/2022 | |
| WO | WO-8301645 | A1 | * | 5/1983 | |

OTHER PUBLICATIONS

Espacenet, machine translation of JP2000080841A, generated Jun. 23, 2025. (Year: 2025).*

* cited by examiner

SMART LOCKING SYSTEM

FIELD OF THE INVENTION

This invention relates to locking systems, including a smart locking system for use with utility panels.

BACKGROUND

Utility boxes, such as residential and/or commercial electrical breaker boxes, typically include a metal box enclosure, a front panel that closes the enclosure, and one or more electrical circuit breakers (e.g., electrical panels) inside the box. When the panel is open, the circuit breakers may be used to turn off and turn on electrical power to the associated building.

Because the power to a building may be shut off by using the circuit breakers, the front panel is typically locked to prevent unauthorized access to the breakers. However, such locking systems are oftentimes easily broken and may provide an adequate level of protection to the box and the breakers therein.

Accordingly, there is a need for a locking system that provides a higher level of protection to utility boxes. There also is a need for a smart locking system that may utilize other elements, such as communication systems and motion detection systems, to provide an added level of security to such boxes.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

In general, the system and method according to exemplary embodiments hereof includes a smart locking system. The smart locking system may include an internal controller, a locking mechanism, a motion activated camera, full Internet and/or other network connectivity (e.g., Bluetooth, Wi-Fi, cellular, satellite, LAN, etc.), a dedicated power supply, a control panel, GPS assist, a motion activated light, a dedicated mobile application, and other elements.

Figure 1:
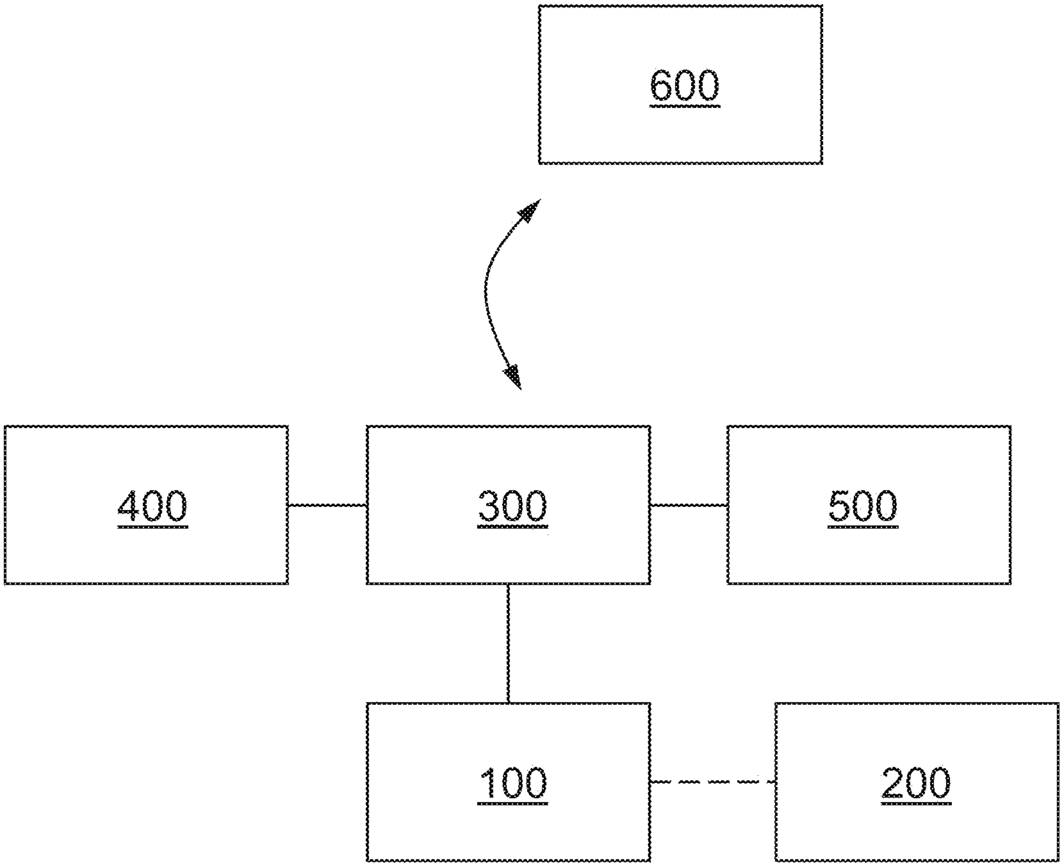
FIG. 1 shows a block diagram of a locking system in accordance with exemplary embodiments hereof.

FIG. 1 shows a block diagram of the smart locking system 10 (also referred to herein as simply the system 10). As shown, the smart locking system may include a primary locking assembly 100 and a locking member assembly 200. The system 10 also may include a control module 300, a motion sensing module 400, a communications module 500, a backend system 600 (e.g., a cloud server), and other elements.

Figure 2:
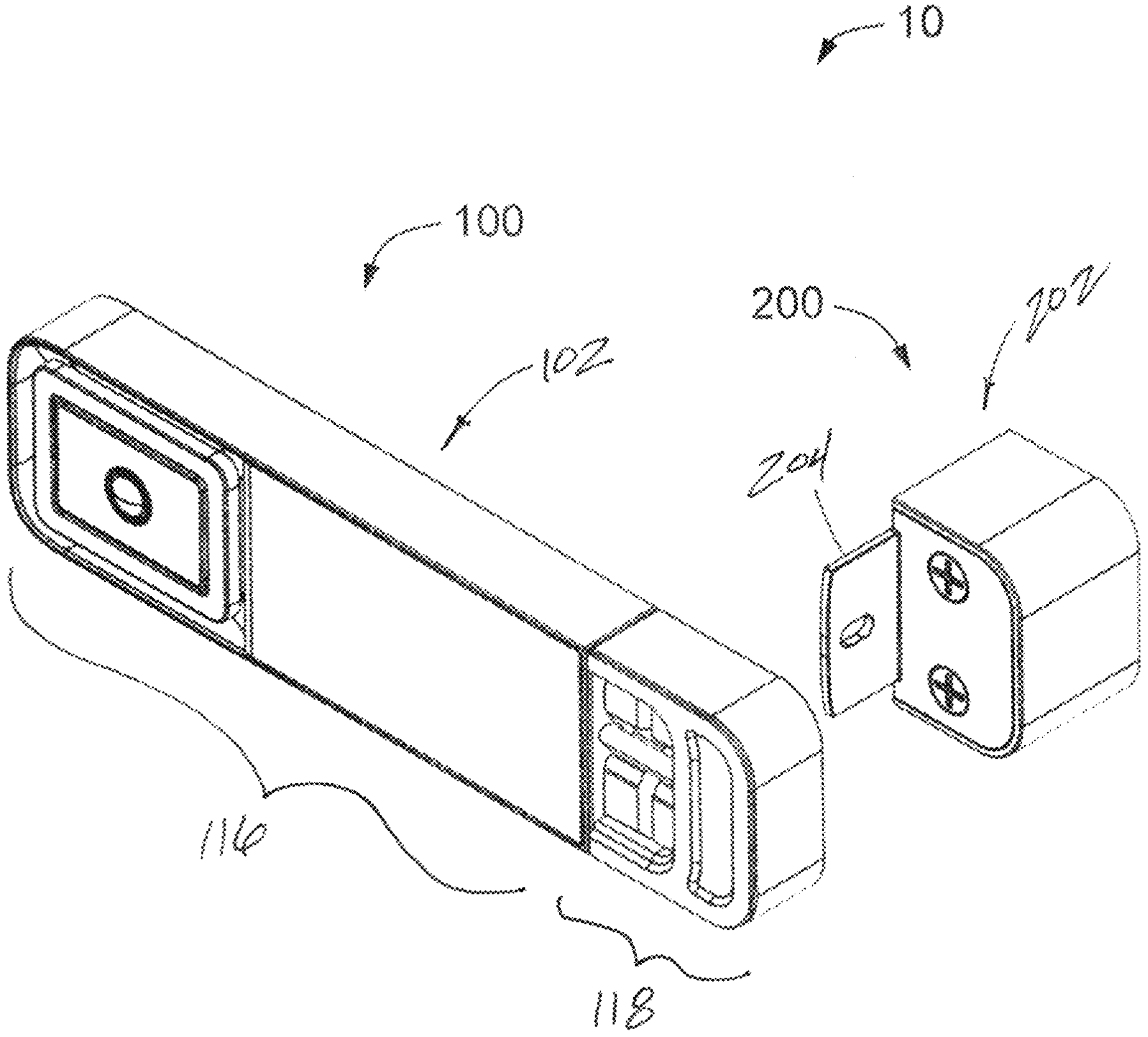
FIGS. 2-4 show aspects of a locking system in accordance with exemplary embodiments hereof.
Figure 3:
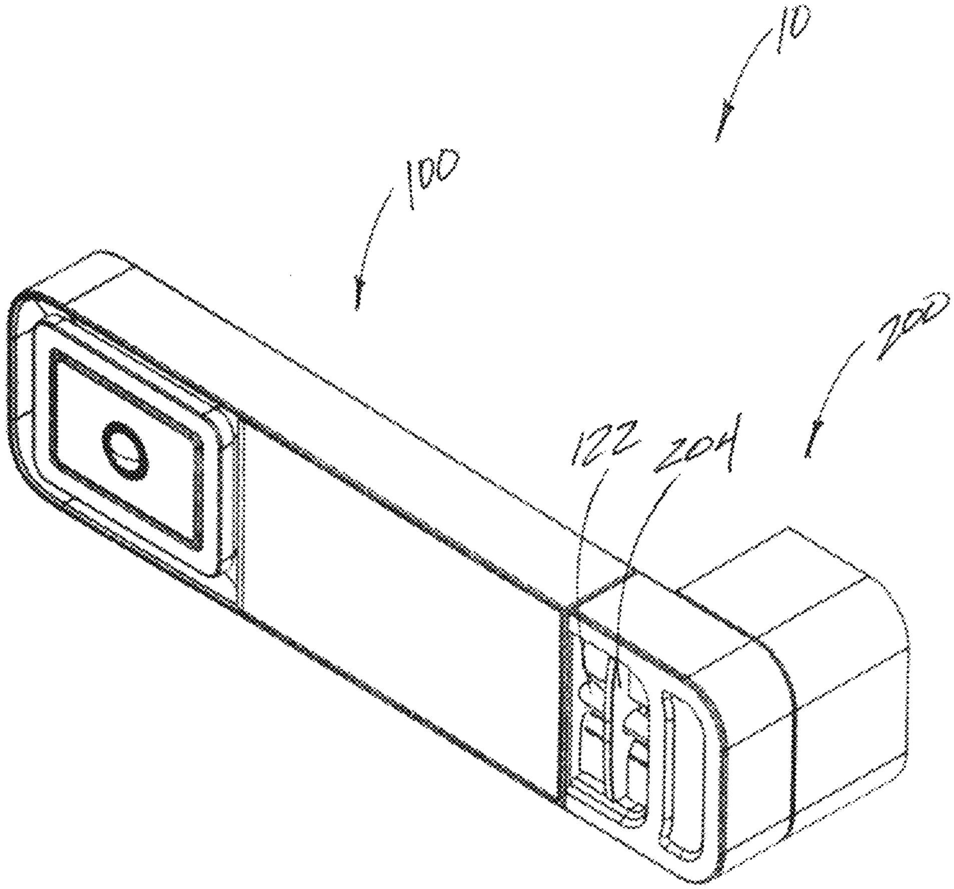

FIG. 2 shows an embodiment of a smart locking system 10 including the primary locking assembly 100 and the locking member assembly 200 unlocked and separated from one another, and FIG. 3 shows the assemblies 100, 200 in a locked configuration.

In general, the primary locking assembly 100 provides a locking mechanism (e.g., a locking rod or pin) and the locking member assembly 200 includes a lockable member (e.g., a locking tab). The locking mechanism (e.g., the pin) may engage with the lockable member (e.g., the tab) to provide locking utility.

Details of the assemblies and modules 100, 200, 300, 400, 500 will be provided herein with regard to the figures. The smart locking system 10 also may include other aspects and/or elements to fulfill its functionalities.

Figure 4:
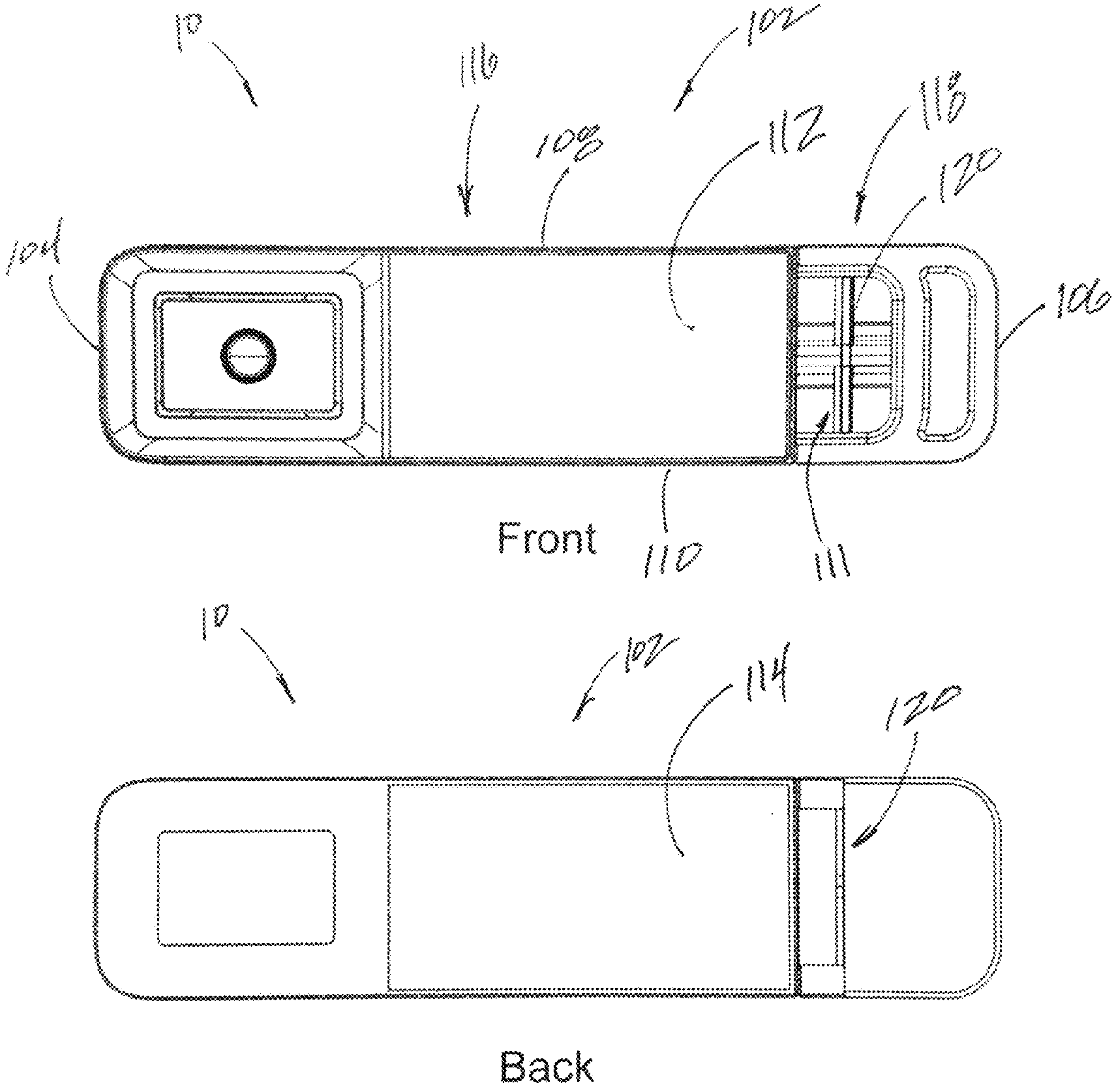

FIG. 4 shows a front view and a back view of the smart locking system 10.

In some embodiments, as shown in FIGS. 2-4, the primary locking assembly 100 includes a primary assembly body 102 (e.g., defined by a housing), a left side 104, a right side 106, a top side 108, a bottom side 110, a front side 112, and a back side 114. The assembly 100 also includes a main body portion 116 and a forward locking portion 118. The locking member assembly 200 includes a locking member body 202 (e.g., defined by a housing), and a lockable member 204 (e.g., the locking tab) extending therefrom. The lockable member 204 may include a plate (e.g., comprising metal or other suitable hard material) and/or other suitably formed member(s).

In some embodiments, the primary locking assembly 100 may include a locking slot 120 in its back side 114 designed to receive the locking member assembly's lockable member 204 when two assemblies 100, 200 are engaged as described herein. The locking slot 120 preferably extends through the assembly's body 102 from the back side 114 to the front side 112 (or at least a portion thereof). The primary locking assembly 100 also includes a locking mechanism 122 (e.g., the locking rod or pin) that may releasably engage the lockable member 204 when the assemblies 100, 200 are engaged and the lockable member 204 is received into the locking slot 120. This may lock the assemblies 100, 200 together.

In some embodiments, the area within the forward locking portion 118 that includes the locking slot 120 and the locking tab 204 (when engaged) may include a window 111 on the front side 112 so that the engagement of the locking pin 122 with the locking tab 204 within the locking slot 120 may be visible through the window 111. This may enable a user of the system to have a visual confirmation of the engagement of these elements and of the locking of the overall system 10. In other embodiments, this open area may be covered by a transparent plate or windowpane. In some embodiments, the windowpane may comprise Polycarbonate or other suitable transparent or semi-transparent material. In other embodiments, this area may not be open and may instead be covered and not visible from the front 112 of the system 10.

Figure 5:
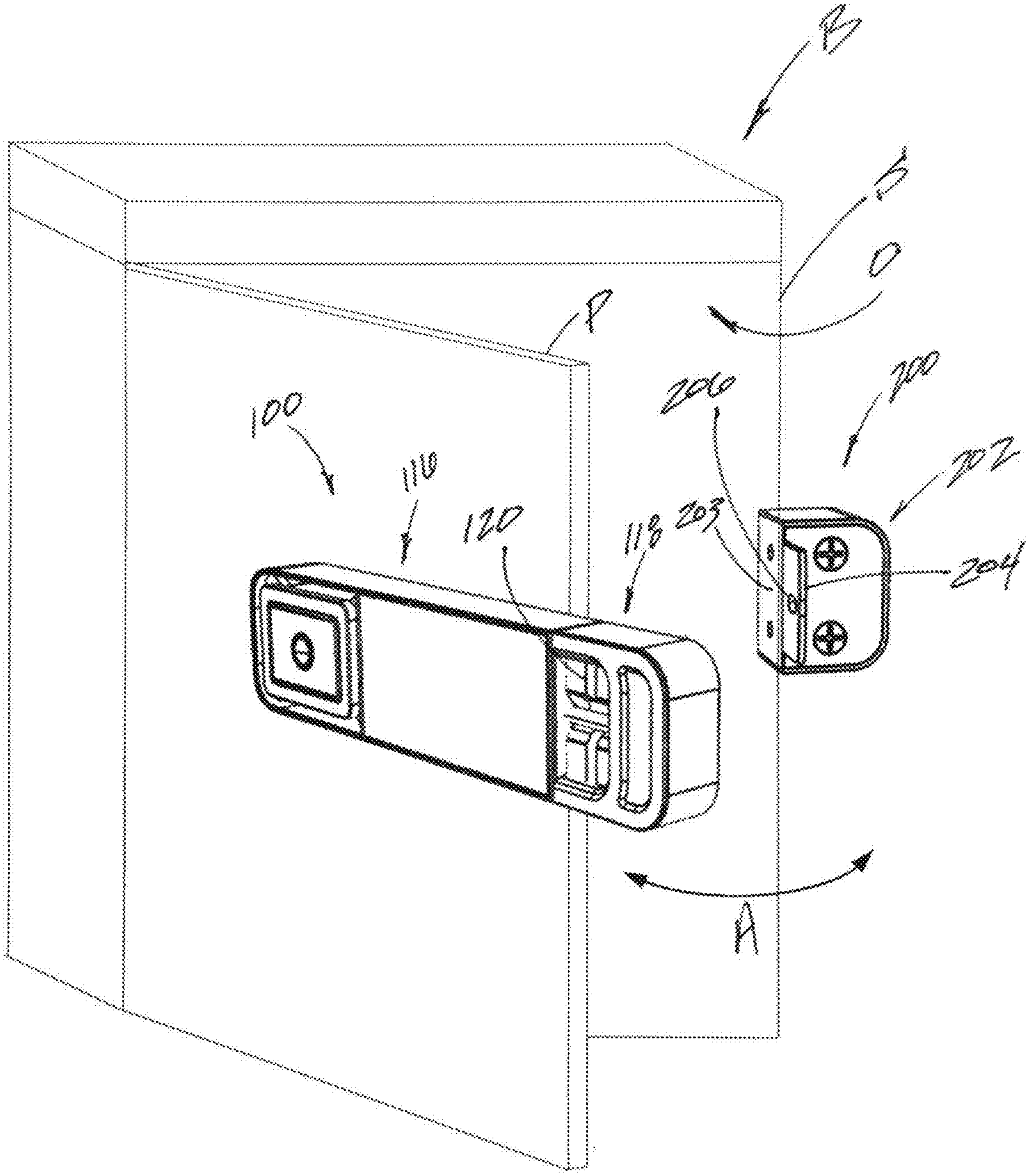
FIGS. 5-7 show a locking system configured with a box in accordance with exemplary embodiments hereof.
Figure 6:
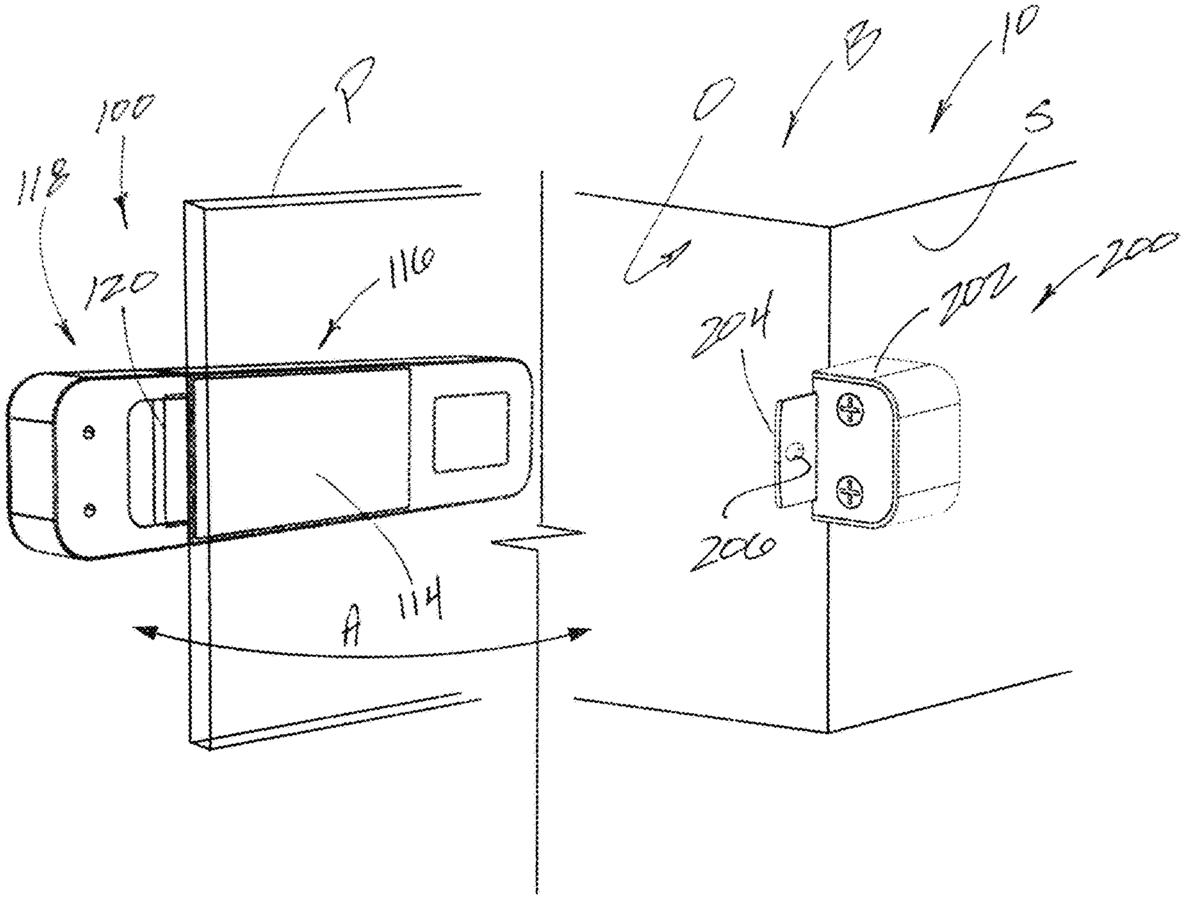

In some embodiments, as shown in FIGS. 5 and 6, the smart locking system 10 may be configured to lock a box B, such as a utility box (e.g., a commercial and/or residential electrical box). The box B is shown generally reduced in size with some portions shown as transparent for clarity. The box B may generally include an interior defined by at least one sidewall S, a front opening O, and a front panel P configured to open and/or close the box's front opening O. The front panel P may be rotatably configured with the box opening (e.g., via one or more hinges) so that it may swing open and closed as represented by the arrow A.

For the purposes of this specification, the system 10 will be described primarily with respect to being configured to lock and unlock a utility box B, such as an electrical breaker box. However, it is understood that the system 10 may be used to lock and unlock any type(s) of containers and/or other structures (e.g., a gate, a storage unit, a truck, etc.) and that the scope of the system 10 is not limited in any way by the type(s) of structure(s) that it may be used with.

In some embodiments, as shown in FIGS. 5 and 6, the back side 114 of the primary assembly 100 may rest against a front side of the box's panel P and be secured thereto using screws, bolts, adhesive, magnets, other suitable attachment mechanisms, and any combinations thereof. As such, it may be preferable that the primary assembly's back side 114 be substantially flat so that the back side 114 may rest generally flush against the panel P without any gaps or discontinuities. An installation template may be provided to a user that outlines the recommended location and orientation of the assembly 100 on the panel P, the location of screw holes that may need to be drilled through the panel P to receive screws to attach the assembly 100 to the panel P, and other useful information. In this way, the user may easily install the assembly 100 to the panel P. As shown in FIGS. 5 and 6, it may be preferable that the assembly 100 is positioned on the panel P such that its forward locking portion 118 extends at least partially beyond the edge of the panel P. In this way, the locking slot 120 may be exposed, unobstructed, and positioned to receive the locking tab 204.

In some embodiments, the locking member assembly 200 may include a first side 203 that may rest against a side S of the box B (e.g., the right side) and be secured thereto using screws, bolts, adhesive, magnets, other suitable attachment mechanisms, and any combinations thereof. As such, it may be preferable that the locking member assembly's first side 203 be substantially flat so that the first side 203 may rest generally flush against the panel side S without any gaps or discontinuities. An installation template also may be provided for the assembly 200. As shown, it may be preferable that the assembly 200 be positioned on the side S such that its locking tab 204 extends at least partially beyond the edge of the side S. In addition, it may be preferable that the locking tab 204 be oriented to match the primary assembly's locking slot 120 (e.g., vertically) such that the locking tab 204 may be received into the locking slot 120 when the system 10 is locked as described in other sections.

While the system 10 is shown in FIGS. 5-6 as being oriented generally horizontal with respect to the panel P, it is understood that the system 10 may be configured in any other suitable orientation, e.g., vertically, with the locking member assembly 200 configured with a bottom side of the box instead of the right side of the box as depicted in FIGS. 5-6.

Figure 7:
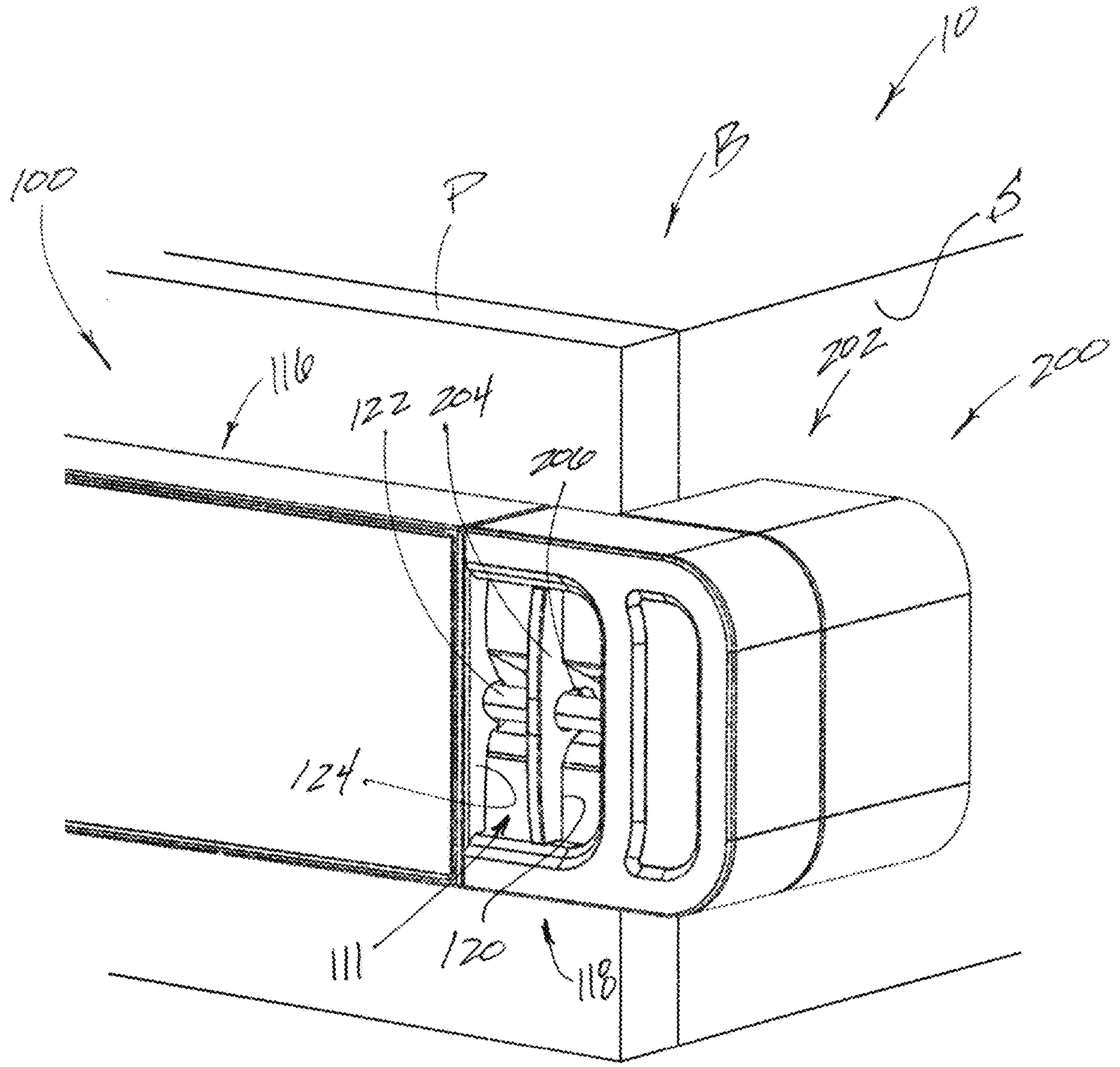

FIG. 7 shows and engagement of the assemblies 100, 200 when the box's panel P is in its closed position.

In some embodiments, as shown in FIG. 7, when the box's panel P is closed, the locking member assembly's locking tab 204 may be received into the primary locking assembly's locking slot 120 from the primary locking assembly's back side 114 and may extend at least partially through the slot 120 towards the front side 112. As shown, it may be preferable that the assemblies 100, 200 be positioned and oriented such that the box's panel P may rest flush against the front of the box B in its closed position (e.g., as it may be designed to do) and not be obstructed by the assemblies 100, 200.

In some embodiments, the locking tab 204 includes a locking hole 206 that passes at least partially through (and preferably all the way through) the locking tab 204 and that is designed to receive the primary locking assembly's locking pin 122.

Figure 8A:
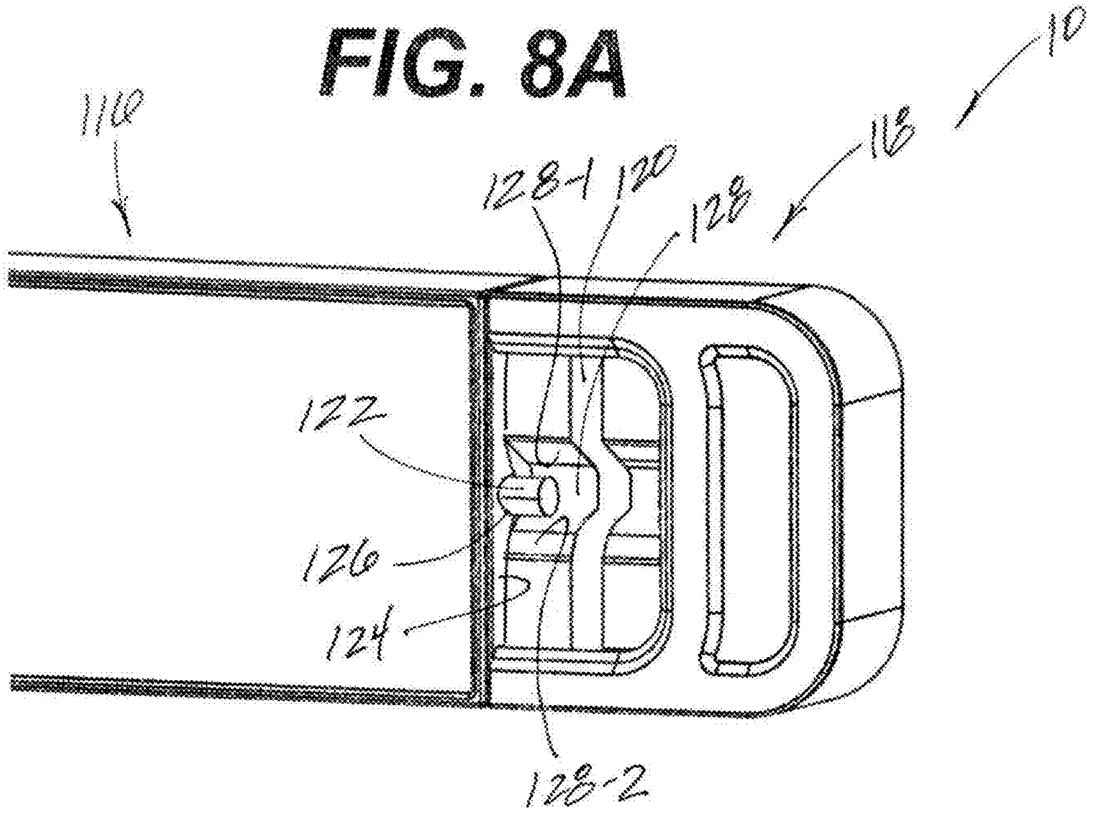
FIGS. 8A-8B show aspects of a locking system in accordance with exemplary embodiments hereof.
Figure 8B:
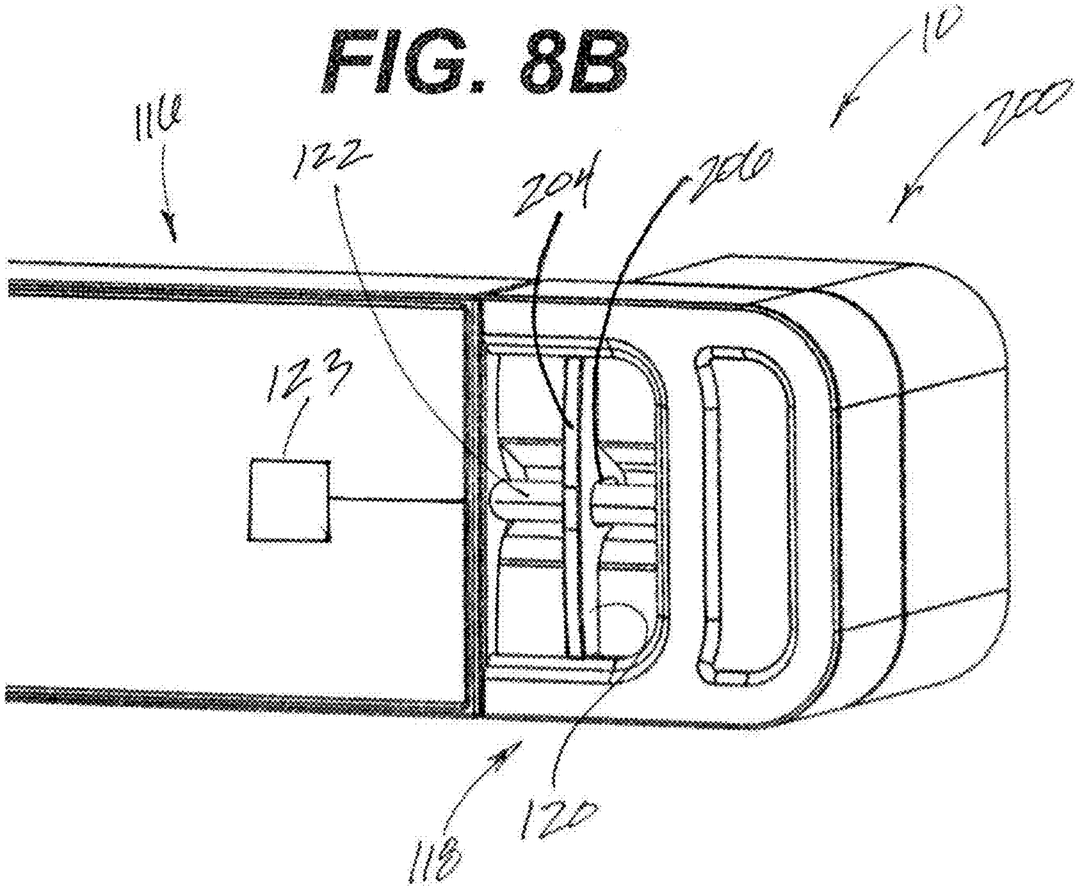

In some embodiments, as shown in FIGS. 8A and 8B, the primary locking assembly 100 includes a locking pin 122 that may be controlled to move from a generally retracted and unlocked position as shown in FIG. 8A to a generally extended and locking position as shown in FIG. 8B.

In some embodiments, when the locking tab 204 is received into the locking slot 120, the locking hole 206 may be aligned with the locking pin 122 so that when the locking pin 122 is extended into its locking position, the locking pin 122 may extend through the locking hole 206 without obstruction. This may lock the primary locking assembly 100 and a locking member assembly 200 together thereby locking the box's front panel P closed.

Notably, FIG. 8A shows the locking slot 120 without an inserted locking tab 204 and with the locking pin 122 retracted and unlocked, and FIG. 8B shows the locking tab 204 received into the locking slot 120 and with the locking pin 122 extended and locked through the locking hole 206 of the locking tab 204. As such, FIG. 8A shows the system 10 in an unlocked configuration and FIG. 8B shows the system 10 in a locked configuration.

In some embodiments, the locking pin 122 extends and retracts laterally. In some embodiments, a forward portion of the locking pin 122 is controllable to extend from a position to the left of the locking slot 120 to a position to the right of the locking slot 120 (e.g., to lock the system 10) and back again (e.g., to unlock the system 10). When the locking pin 122 is retracted, the locking slot 120 is unobstructed and able to receive the locking tab 204. When the locking tab 204 is received into the locking slot 120, a distal portion of the locking pin 122 may be extended through the locking tab's locking hole 206 to a position to the right of the locking slot 120. In this position, the primary locking assembly 100 and the locking member assembly 200 may be locked together.

In some embodiments, when the locking pin 122 is extended into its locking position, the far distal end of the pin 122 may enter into a locking notch, hole, recess, or nest in the assembly's forward portion 118 that may hold the pin's far distal end secure thereby providing additional support to the pin 122 when extended.

In some embodiments, a proximal portion of the locking pin 122 may reside within the assembly's main body portion 116 and be configured with a movement assembly 123 that may cause a distal portion of the pin 122 to extend into and retract out of the assembly's forward locking portion 118 to lock and unlock the locking tab 204. In some embodiments, the movement assembly 123 may include a rack and pinion assembly, a double cam mechanism, a channel slide, other suitable types of movement assemblies, and any combinations thereof.

In some embodiments, the assembly's main body portion 116 and the assembly's forward locking portion 118 may be separated from one another by a sidewall or partition 124. In some embodiments, the locking pin 122 may pass through a hole 126 in the partition 124. The partition 124 may block access into the assembly's main body portion 116 thereby making it generally tamper proof.

Figure 9:
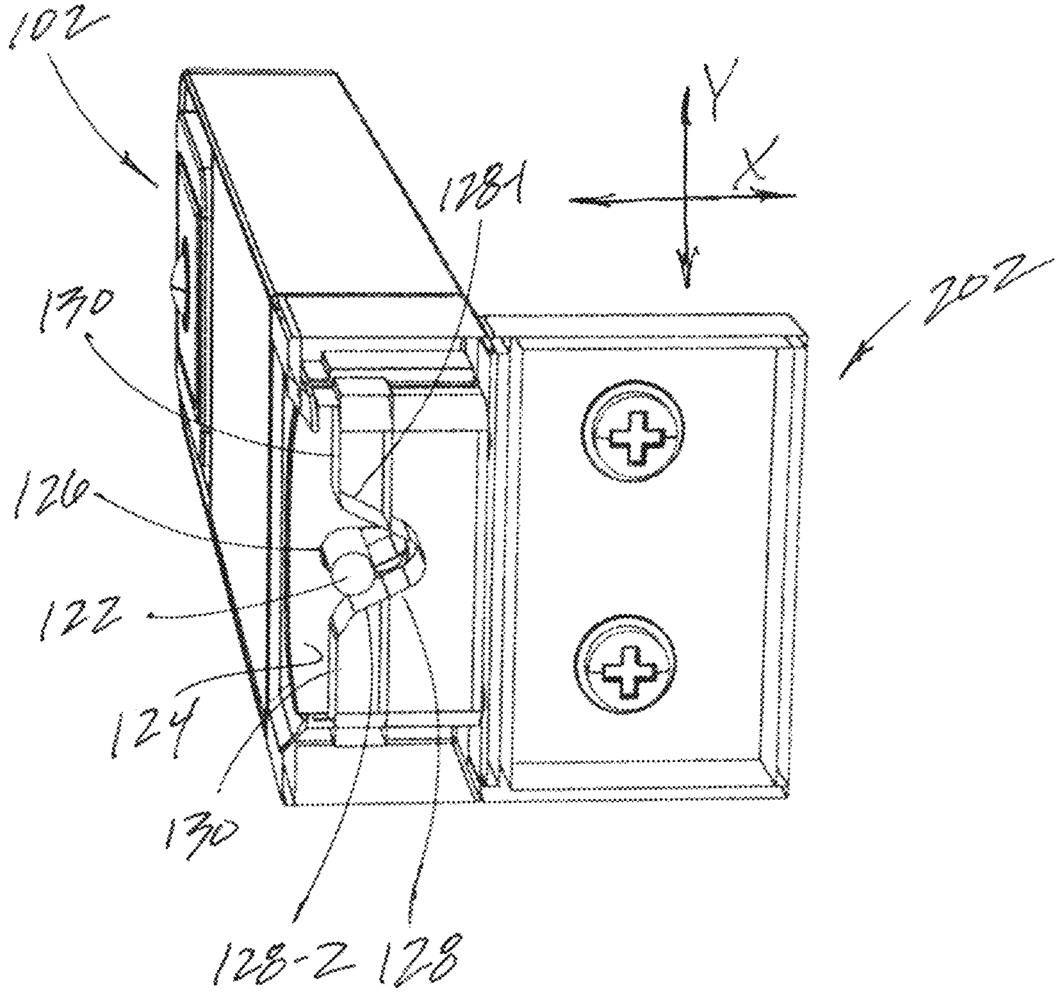
FIG. 9 shows a sectional view of a locking system in accordance with exemplary embodiments hereof.

FIG. 9 shows a sectional view of the system 10 with the sectional cut to the left of the locking slot 120.

In some embodiments, as shown in FIGS. 7A and 9, the partition hole 126 through which the locking pin 122 extends may be sized to generally match the diameter of the locking pin 122. In other embodiments, the partition hole 126 may be sized slightly larger than the diameter of the locking pin 122, and the locking pin 122 may be implemented to have a degree of freedom in the X-Y plane such that the pin 122 may move laterally side-to-side and/or up-and-down (and in any combination thereof) in the X-Y plane while still being configured with the movement assembly 123. In this way, the locking pin 122 may self-align with the locking hole 204 during the engagement process. For example, if the locking hole 204 is slightly misaligned with the locking pin 122 during the engagement process, the locking pin 122 may move slightly in a direction that may properly align the pin 122 with the hole 204 so that the two may properly engage.

In some embodiments, as shown in FIGS. 7A and 9, the forward locking portion 118 includes a locking pin guide 128 including an upper guide portion 128-1 and a lower guide portion 128-2. The pin guide 128 may generally provide a recess or channel through which the locking pin 122 may travel during its extension and retraction movements. The channel may be defined by the upper guide portion 128-1, the lower guide portion 128-2, and the apex between the upper and lower guide portions 128-1, 128-2. In this way, the locking pin 122 may be generally held within the channel with its movements controlled and limited by the dimensions of the pin guide 128.

In addition, the pin guide 128, including the upper and lower portions 128-1, 128-2, may generally limit access from the front side 112 of the system 10 to the locking pin 122 thereby protecting the pin 122 from tampering. That is, because the upper and lower portions 128-1, 128-2 extend close to the locking pin 122 from above and from below, respectively, the free space around the locking pin 122 may be minimized such that tools (e.g., pliers or a screwdriver) may not easily fit within this space and may not be used in an attempt to dislodge or otherwise disable the locking pin 122.

Figure 10:
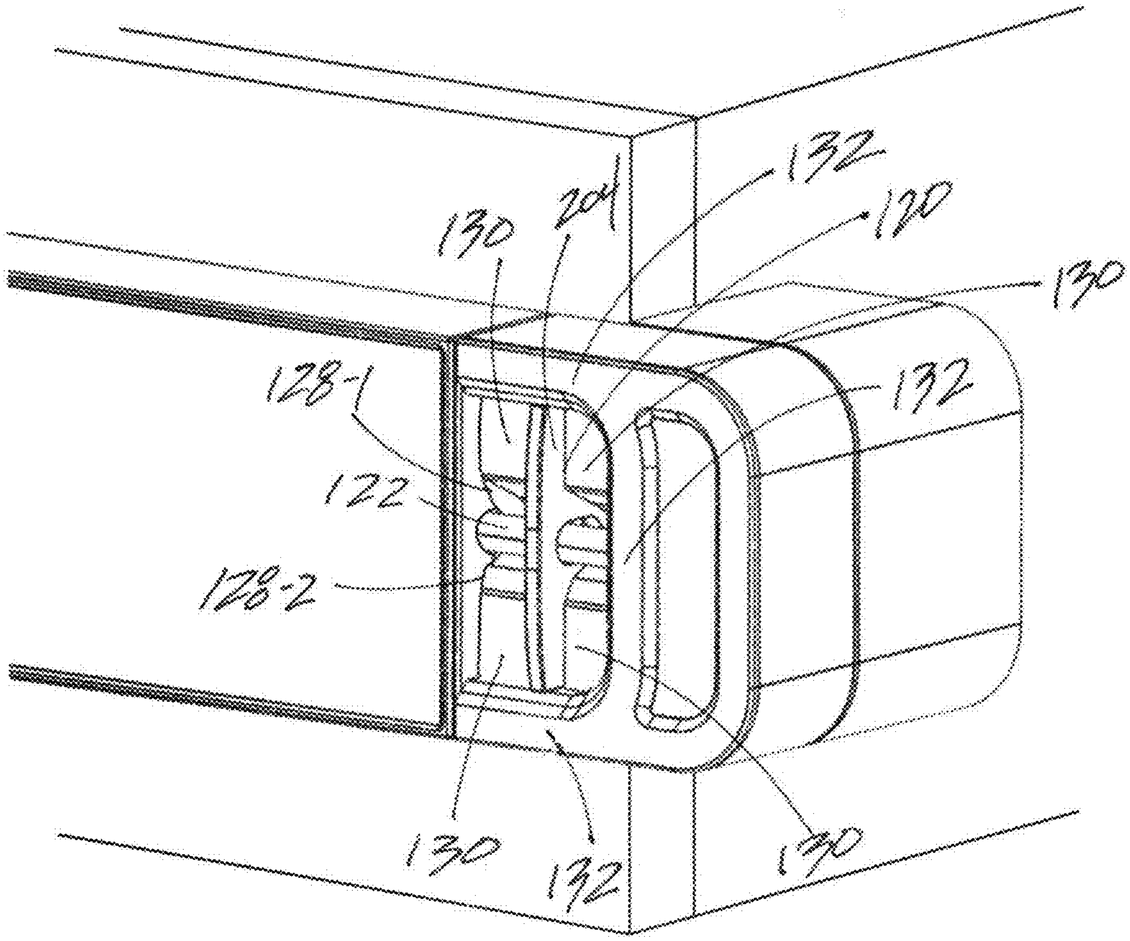
FIG. 10 shows a locking system configured with a box in accordance with exemplary embodiments hereof.

In some embodiments, as shown in FIGS. 9-10, the upper and lower guide portions 128-1, 128-2 are each coupled to a blocking member 130, with a first blocking member 130 extending generally from the upper guide portion 128-1 towards (and preferably all the way to) the top side 108 of the system 10 and a second blocking member 130 extending from the lower guide portion 128-2 towards (and preferably all the way to) the bottom side 110 of the system 10. The blocking members 130 also may extend from the partition 124 to the far distal end of the assembly's forward locking portion 118. As shown in FIG. 10, the locking slot 120 may pass through the first and second blocking members 130 as well as through the locking pin guide 128 including the upper and lower locking pin guide portions 128-1, 128-2. In this way, a significant portion of the locking tab 204 when received within the locking slot 120 may be hidden and generally obstructed by the blocking members 130 and by the locking pin guide 128. For example, about 20% or more of the locking tab 204 may be hidden and obstructed, and preferably about 50% or more of the locking tab 204 may be hidden and obstructed, and more preferably about 80% or more of the locking tab 204 may be hidden and obstructed, and even more preferably about 90% or more of the locking tab 204 may be hidden and obstructed. This may limit the amount of access from the front side 112 of the system to the locking tab 204 thereby protecting the locking tab 204 from tampering. That is, because a significant portion of the locking tab 204 may be hidden and obstructed within the slot 204 within the blocking members 130 and locking pin guide 128, the free space around the locking tab 204 may be minimized such that tools (e.g., pliers or a screwdriver) may not easily fit within this space and may not be used in an attempt to dislodge or otherwise disable the locking tab 204.

In some embodiments, as shown in FIG. 10, the assembly's forward locking portion 118 includes upper, lower, and forward outer guard walls 132. The upper and lower guard walls 132 may extend from the top side 110 and the bottom side 112 over upper and lower portions, respectively, of the upper and lower blocking members 130, thereby providing structural support to the blocking members 130. In addition, the upper and lower guard walls 132 also may cover up an upper portion of the locking slot 120 at the slot's top end and a lower portion of the slot 120 at the slot's bottom end. As such, the upper and lower guard walls 132 also may cover up corresponding upper and lower portions of the locking tab 204 when the locking tab 204 is received into the locking slot 120. This may further protect the locking tab 204 from being tampered with and potentially dislodged.

In some embodiments, the forward guard wall 132 may generally cover and protect a far distal end of the locking pin 122 when the locking pin 122 is extended in its locking position.

Figure 11:
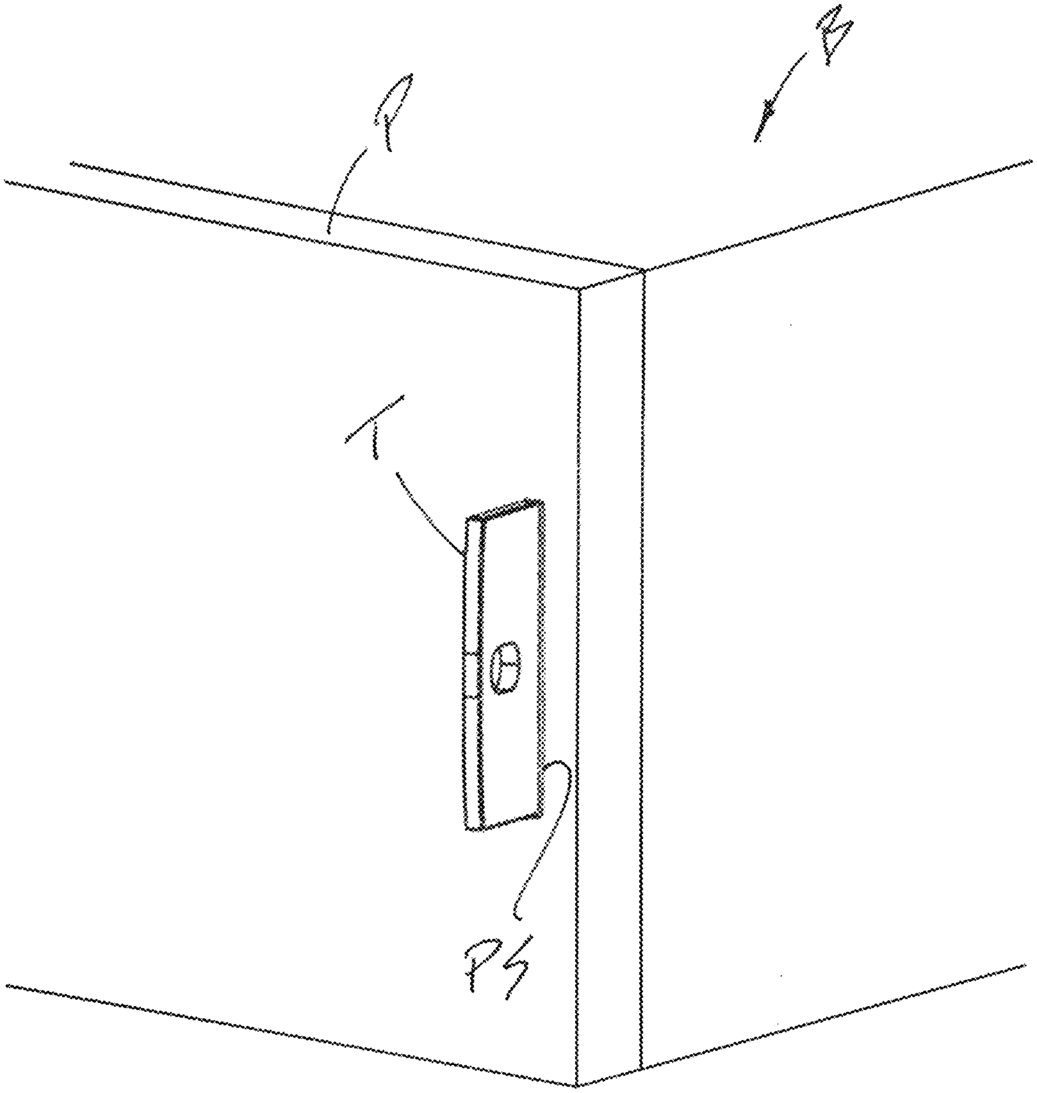
FIG. 11 depicts a box with a locking tab in accordance with exemplary embodiments hereof.
Figure 12:
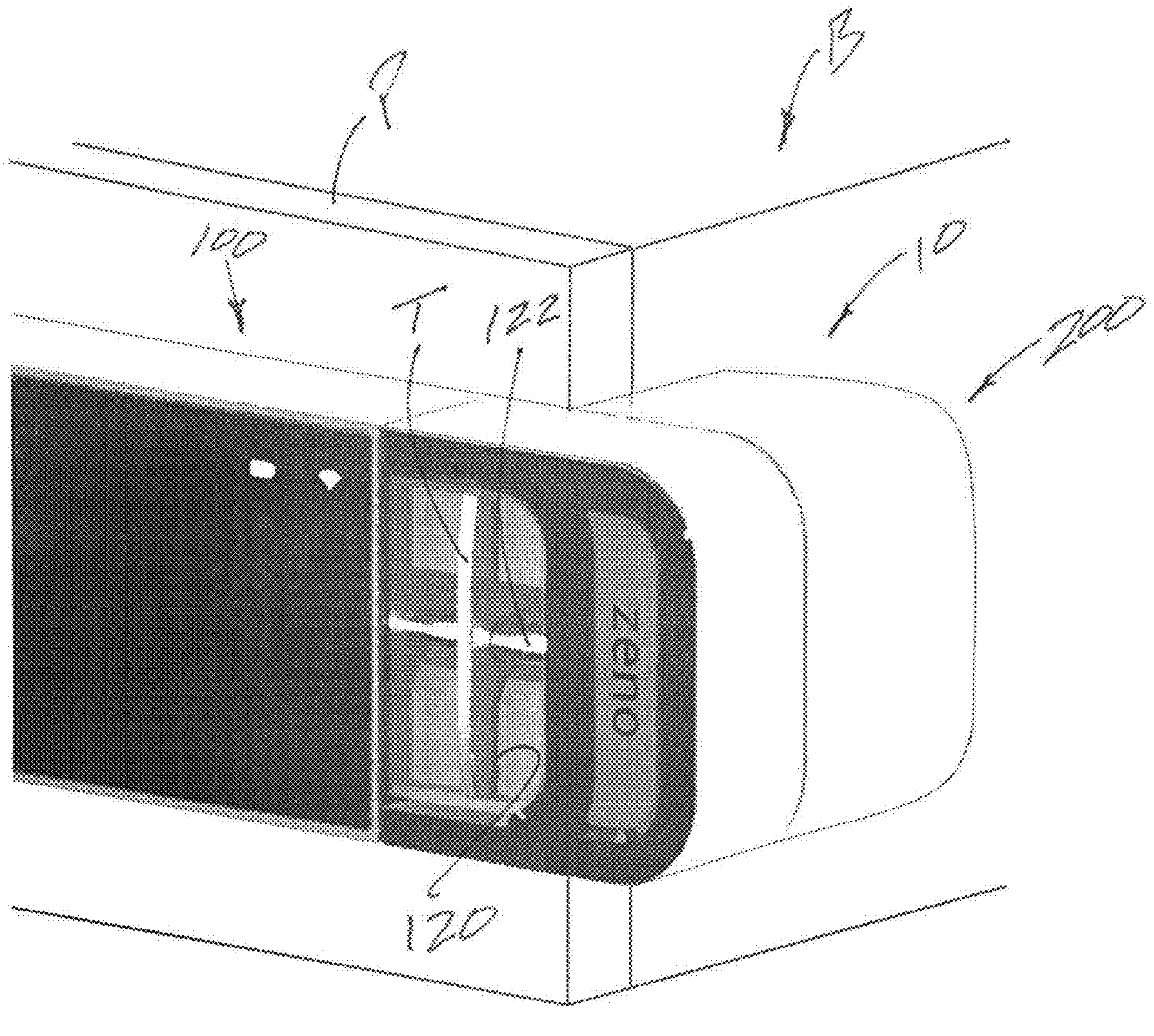
FIG. 12 depicts a locking system configured with the box of FIG. 11 in accordance with exemplary embodiments hereof.

In some embodiments, as shown in FIG. 11, the box B may provide a locking tab T that may pass through a panel slot PS in the front side of the panel P. In this case, the system 10 may not necessarily provide its locking tab 204 and instead may be configured to engage with the locking tab T provided by the box B. The result of this engagement is shown in FIG. 12. As shown, the provided locking tab T is received into the system's locking slot 120 and locked in place by the system's locking pin 122. It is understood that all aspects of all embodiments described herein with respect to the engagement of the system 10 using its included locking tab 204 also pertain to the engagement of the system 10 using the locking tab T provided by the box B.

In some embodiments, the backend platform 600 may include one or more servers that may include CPUs, memory, software, operating systems, firmware, databases, network cards and any other elements and/or components that may be required to the backend platform 600 to perform its functionalities.

In some embodiments, the control module 300 includes a CPU, a microcontroller, a microprocessor, and/or other type(s) of processors or control chips as well as all ancillary components (e.g., memory, software, etc.) as necessary to control the various controllable elements of the system 10.

In some embodiments, the control module 300 includes an interface (e.g., a touchscreen, a keyboard, a keypad, etc.) that may receive input from the user (e.g., a passcode to lock and unlock the system 10). The interface also may include a biometrics device (e.g., a fingerprint reader, retina scanner, facial recognition system, voice recognition system, etc.)

that may be used to identify the identity of the approved user and to thereby allow the user to lock and/or unlock the system 10. The interface also may include a back-lighting unit such that the system 10 may glow when the environment becomes dark (e.g., at night, during a storm, etc.). In this way, a potential intruder may be alerted to the system 10 as a possible deterrence.

In some embodiments, the interface also may provide the user with information (e.g., via a display) regarding the system 10, such as, without limitation, the status of the system 10 (e.g., locked or unlocked), error messages, possible intruder detection log(s), and other information.

In some embodiments, the interface may include a mobile application that the user of the system 10 may run on his/her mobile phone to communicate with the system 10. In this way, the user may generally control the system 10 remotely, may receive alerts from the system 10, etc.

In some embodiments, upon receiving a command (e.g., via the interface) to lock the system 10, the controller 300 may control the movement mechanism 123 to move the locking pin 122 into its extended and locked position, and upon receiving a command to unlock the system 10, may control the movement mechanism 123 to move the locking pin 122 into its retracted and unlocked position.

In some embodiments, the control module 300 also may control the motion sensing system 400 and the communications module 500 and also may communicate with the backend system 600.

In some embodiments, the motion sensing system 400 may include passive infrared (PIR) sensors, ultrasonic sensors, microwave sensors, and other types of sensor systems to detect the presence of a potential intruder. The motion sensing system 400 also may include a camera that may begin recording after a motion has been detected. In this way, the motion sensing system 400 may record the presence of the intruder and may upload the captured footage to the backend system 600 and/or directly to the user, to authorities, and/or to other entities. The system 400 also may emit a red "recording" light to notify the intruder that he/she is being recorded.

In some embodiments, the motion sensing system 400 may include facial and/or object recognition capabilities.

In some embodiments, the communications module 500 may include communication functionalities including networked communications (e.g., LAN, WAN, WWAN, etc.), Wi-Fi, cellular communications and protocols (e.g., GSM, CDMA, TDMA, etc.), satellite communications, other suitable communications systems, and any combinations thereof. The communications module 500 also may communicate with the backend system 600 as necessary.

In some embodiments, the motion sensing system 400 may sense motion (e.g., human motion) within a predefined radius about the system 10 in order to detect a possible intruder. Upon sensing such a movement, the motion sensing system 400 may provide an alert to the control module 300 of the event. The control module 300 may then take one or more of the actions described below.

1. Trigger an alarm from the system 10, including but not limited to, an audio alarm emitted form a speaker configured with the system 10 (e.g., a siren or similar, a voice alerting the intruder that they are trespassing and that law enforcement have been notified), a visual alarm delivered by a light and/or the interface (e.g., a flashing light, a warning message on the display, etc.), and/or other types of alarms.
2. Send a communication to the user (e.g., using the communication module 500) to alert the user of the event. This may include any type of suitable communication including a text message, an email, a voice call, an alert sent to a mobile application (e.g., via the backend system 600), etc.
3. Send a communication to law enforcement such as the local police and/or a security entity to alert the authority of the event. This may include any type of communication including a text message, an email, a voice call (e.g., a 911 call), an alert sent to a mobile application, etc.
4. Scan the immediate area about the system 10 for mobile phones (e.g., a mobile phone held by the possible intruder) and identify the phone's Internet Protocol (IP) address. Once identifies and recorded, the intruder's IP address may be provided to law enforcement to track, identify, and/or subpoena the intruder.

In some embodiments, the motion sensing system 400 may include one or more vibration detecting devices, e.g., accelerometers, that may detect if any element of the system 10 (e.g., the primary locking assembly 100, the locking member assembly 200, the locking tab 204, the locking pin 122, the blocking members 132, etc.) may be moved in a way that may indicate that the system 10 is being tampered with. For example, if an intruder attempts to dislodge either of the assemblies 100, 200 from the utility box B, the system 400 may sense vibrations related to the event and may trigger the control module 300 to take one or more of the actions described above.

In some embodiments, the system 10 includes a power source, e.g., one or more rechargeable and/or replaceable batteries, a solar panel, a physical electrical connection (e.g., to a power outlet), and/or other suitable power supplies.

In some embodiments, the system 10 may include a traditional physical key mechanism that may receive a physical key to unlock the system 10. This may be useful in the case of a power outage of the system 10.

In some embodiments, the system 10 may interface with a mobile application running on the user's mobile phone to enable the user to broadcast his/her voice in real time over a speaker configured with the system 10. In this way, the user, upon being notified of a potential intruder in the area of the system 10, may broadcast his/her voice to the intruder telling the intruder that he/she is trespassing and that law enforcement has been notified, etc.

It is understood that any aspect or element of any embodiment of the system 10 described herein may be combined with any other aspect or element of any other embodiment of the system 10 to form additional embodiments of the system 10, all of which are within the scope of the system 10.

Computing

The services, mechanisms, operations, and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 13:
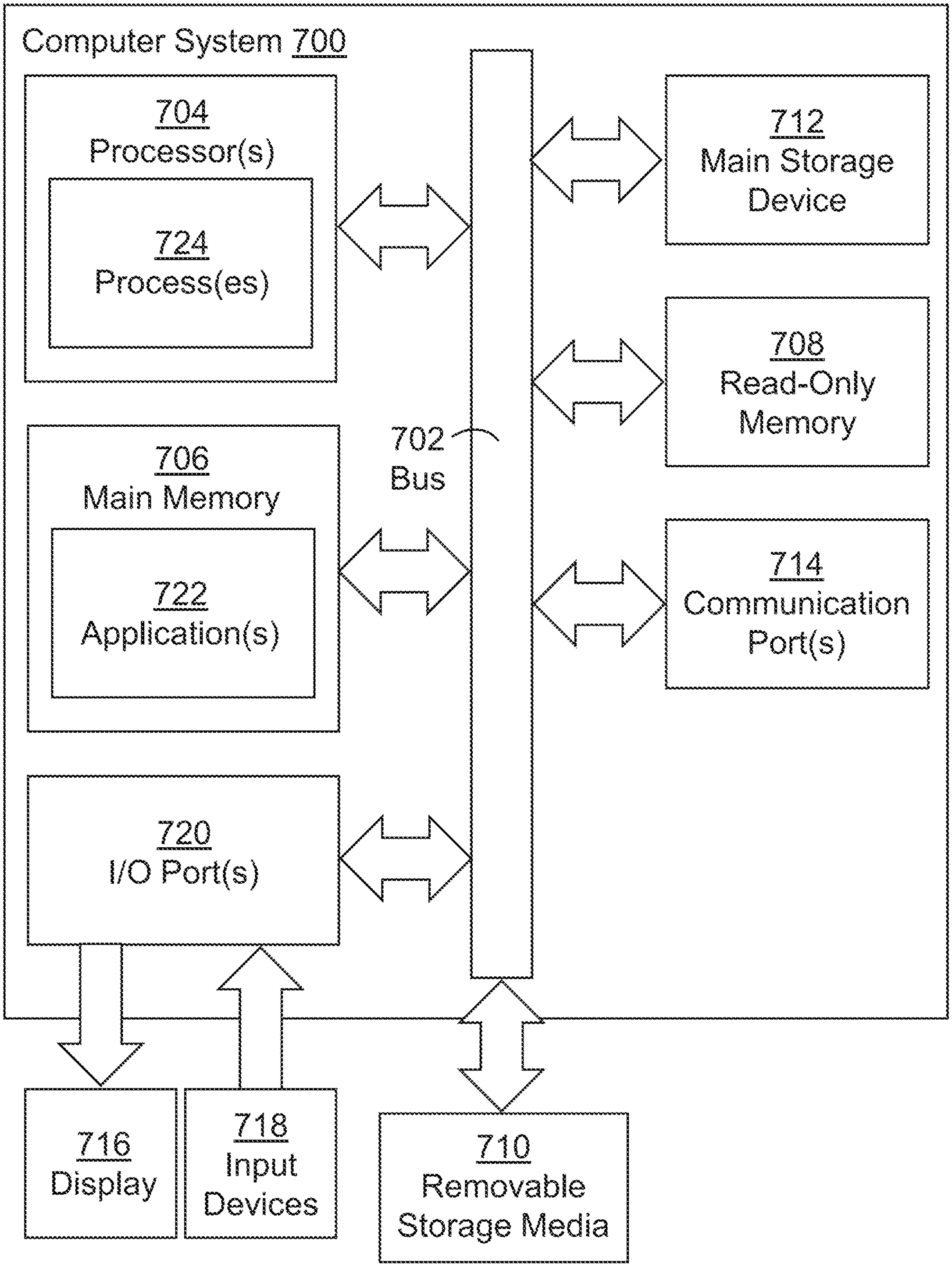
FIG. 13 shows aspects of a computing system according to exemplary embodiments hereof.

FIG. 13 is a schematic diagram of a computer system 700 upon which embodiments of the present disclosure may be implemented and carried out.

According to the present example, the computer system 700 includes a bus 702 (i.e., interconnect), one or more processors 704, one or more communications ports 714, a main memory 710, removable storage media 310, read-only memory 708, and a mass storage 712. Communication port(s) 714 may be connected to one or more networks by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 714 can be any of an RS-232 port for use with a modem-based dial-up connection, a 10/100 Ethernet port, a Gigabit port using copper or fiber, or a USB port, and the like. Communications port(s) 714 may be chosen depending on a network such as a Local Area Network (LAN), a Wide Area Network (WAN), a CDN, or any network to which the computer system 1600 connects. The computer system 700 may be in communication with peripheral devices (e.g., display screen 710, input device(s) 718) via Input/Output (I/O) port 720. Some or all of the peripheral devices may be integrated into the computer system 700, and the input device(s) 718 may be integrated into the display screen 710 (e.g., in the case of a touch screen).

Main memory 710 can be Random Access Memory (RAM), or any other dynamic storage device(s) commonly known in the art. Read-only memory 708 can be any static storage device(s) such as Programmable Read-Only Memory (PROM) chips for storing static information such as instructions for processor(s) 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 702 communicatively couples processor(s) 704 with the other memory, storage and communications blocks. Bus 702 can be a PCI/PCI-X, SCSI, a Universal Serial Bus (USB) based system bus (or other) depending on the storage devices used, and the like. Removable storage media 710 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 710 is encoded with application (s) 722 that support(s) the functionality as discussed herein (an application 722 may be an application that provides some or all of the functionality of one or more of the mechanisms described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 710 via the use of bus 702 in order to launch, run, execute, interpret or otherwise perform the logic instructions of the application(s) 722. Execution of application(s) 722 produces processing functionality of the service(s) or mechanism(s) related to the application(s). In other words, the process(es) 724 represents one or more portions of the application(s) 722 performing within or upon the processor(s) 704 in the computer system 700.

It should be noted that, in addition to the process(es) 724 that carries (carry) out operations as discussed herein, other embodiments herein include the application 722 itself (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 710 (e.g., within Random Access Memory or RAM). For example, application 722 may also be stored in removable storage media 710, read-only memory 708, and/or mass storage device 312.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term “module” refers to a self-contained functional component, which can include hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term “portion” means some or all. So, for example, “A portion of X” may include some of “X” or all of “X”. In the context of a conversation, the term “portion” means some or all of the conversation.

As used herein, including in the claims, the phrase “at least some” means “one or more,” and includes the case of only one. Thus, e.g., the phrase “at least some ABCs” means “one or more ABCs”, and includes the case of only one ABC.

As used herein, including in the claims, the phrase “based on” means “based in part on” or “based, at least in part, on,” and is not exclusive. Thus, e.g., the phrase “based on factor X” means “based in part on factor X” or “based, at least in part, on factor X.” Unless specifically stated by use of the word “only”, the phrase “based on X” does not mean “based only on X.”

As used herein, including in the claims, the phrase “using” means “using at least,” and is not exclusive. Thus, e.g., the phrase “using X” means “using at least X.” Unless specifically stated by use of the word “only”, the phrase “using X” does not mean “using only X.”

In general, as used herein, including in the claims, unless the word “only” is specifically used in a phrase, it should not be read into that phrase.

As used herein, including in the claims, the phrase “distinct” means “at least partially distinct.” Unless specifically stated, distinct does not mean fully distinct. Thus, e.g., the phrase, “X is distinct from Y” means that “X is at least partially distinct from Y,” and does not mean that “X is fully distinct from Y.” Thus, as used herein, including in the claims, the phrase “X is distinct from Y” means that X differs from Y in at least some way.

As used herein, including in the claims, a list may include only one item, and, unless otherwise stated, a list of multiple items need not be ordered in any particular manner. A list may include duplicate items. For example, as used herein, the phrase “a list of XYZs” may include one or more “XYZs”.

It should be appreciated that the words “first” and “second” in the description and claims are used to distinguish or identify, and not to show a serial or numerical limitation. Similarly, the use of letter or numerical labels (such as “(a)”, “(b)”, and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A locking system for use in locking a panel to a locking tab, the locking system comprising:

a locking assembly including a back side adapted to be fixedly attached to the panel and a front side opposite the first sidewall;

a slot in the first sidewall and extending at least partially to the back side, the slot adapted to receive at least a portion of the locking tab;

a locking pin movable to engage the locking tab when the locking tab is received into the slot;

a window in the front side defined by a window perimeter within the front side; and a blocking member behind the front side and including the slot and an outer surface facing through the window, the outer surface including a recess wherein the locking pin is aligned and movable within the recess, wherein the window provides visibility of the blocking member, the slot, the locking pin, and the locking tab when the locking tab is received into the slot.

2. The locking system of claim 1 wherein the locking tab includes a locking hole positioned within the recess when the locking tab is received into the slot.

3. The locking system of claim 2 wherein the locking pin passes through the locking hole when the locking pin is moved to engage the locking tab.

4. The locking system of claim 1 further comprising a motion detecting system and a communication system, wherein the motion detecting system is adapted to detect motion within a radius of the locking system and upon detecting the motion, to send a message using the communication system to a user.

5. The locking system of claim 4 wherein the message incudes an alert, and communications system sends the alert to a mobile device associated with the user.

6. The locking system of claim 5 wherein the motion detecting system includes a facial recognition system adapted to recognize at least one face recorded by the motion detecting system and to communicate an image of and/or an identity of the at least one face to the user.

7. The locking system of claim 4 wherein the motion detecting system is adapted to record video of at least a portion of the radius upon detecting the motion.

8. The locking system of claim 4 wherein the motion detection system is adapted to, upon detecting the motion, scan for a mobile device, and upon locating the mobile device, to identify an Internet protocol (IP) address of the mobile device, and to communicate the IP address to the user.

9. The locking system of claim 4 further comprising an audio alarm, and upon the motion detecting system detecting the motion, activating the audio alarm.

10. The locking system of claim 9 wherein the audio alarm includes a siren, a reproduction of a voice, and/or a broadcast of a user's voice received using the communication system.

11. The locking system of claim 1 further comprising a controller configured to receive a command from a mobile device associated with a user, and upon receiving the command, to move the locking pin to a locked position and/or to an unlocked position.

12. The locking system of claim 1 further comprising a vibration sensor configured to identity a vibration of the locking system representative of a tampering of the system, and upon identifying the vibration, to send a message to a user.

13. The locking system of claim 1 wherein the window includes a windowpane.

14. The locking system of claim 13 wherein the windowpane comprises Polycarbonate.

15. A locking system for use in locking a panel, the locking system comprising:

a first locking assembly including a first assembly back side adapted to be fixedly attached to the panel and a first assembly front side opposite the first assembly back side, a locking pin moveable within the first assembly, a slot in the first assembly back side defined by a slot first sidewall and a slot second sidewall, the slot first sidewall positioned closer to the locking pin than the slot second sidewall is positioned;

a locking tab including a tab distal end adapted to be received into the slot;

a window in the front side defined by a window perimeter within the first assembly front side; and a blocking member behind the first assembly front side and including the slot and an outer surface facing through the window, the outer surface including a recess wherein the locking pin is aligned and movable within the recess, wherein the window provides visibility of the blocking member, the slot, the locking pin, and the locking tab when the locking tab is received into the slot wherein when the tab distal end is received into the slot the locking pin is movable to engage the locking tab.

16. The locking system of claim 15 wherein the locking tab includes a locking hole and the locking pin passes through the locking hole when the locking tab is received into the slot and the locking pin is moved to engage the locking tab.

17. The locking system of claim 15 wherein the tab distal end terminates within the first assembly between the first assembly back side and the first assembly front side.

18. The locking system of claim 15 wherein the locking tab includes a tab proximal end opposite the tab distal end and wherein the locking tab extends linearly from the tab proximal end to the tab distal end.

* * * * *